(12) United States Patent
Smith et al.

(10) Patent No.: US 11,267,199 B2
(45) Date of Patent: Mar. 8, 2022

(54) FILAMENT DRIVE AND LOADING METHOD FOR 3D PRINTER

(71) Applicant: Stratasys, Inc., Eden Prairie, MN (US)

(72) Inventors: Cody Smith, Wayzata, MN (US); Christopher Herbst, Saint Louis Park, MN (US); Shawn Michael Koop, Blaine, MN (US)

(73) Assignee: Stratasys, Inc., Eden Prairie, MN (US)

( * ) Notice: Subject to any disclaimer, the term of this patent is extended or adjusted under 35 U.S.C. 154(b) by 4 days.

(21) Appl. No.: 15/931,415

(22) Filed: May 13, 2020

(65) Prior Publication Data
US 2020/0282644 A1    Sep. 10, 2020

Related U.S. Application Data

(63) Continuation-in-part of application No. PCT/US2019/061524, filed on Nov. 14, 2019.
(Continued)

(51) Int. Cl.
*B29C 64/118*   (2017.01)
*B29C 64/321*   (2017.01)
(Continued)

(52) U.S. Cl.
CPC .......... *B29C 64/227* (2017.08); *B29C 64/118* (2017.08); *B29C 64/321* (2017.08);
(Continued)

(58) Field of Classification Search
CPC .................................................... B29C 64/118
See application file for complete search history.

(56) References Cited

U.S. PATENT DOCUMENTS 5,121,329 A * 6/1992 Crump ................... B33Y 40/00
                                                                700/119
5,181,433 A * 1/1993 Ueno ....................... F16H 55/08
                                                                 74/409
(Continued)

FOREIGN PATENT DOCUMENTS

CN          207044697 U      2/2018
EP          2117793 A1      11/2009
(Continued)

OTHER PUBLICATIONS

International Search Report and Written Opinion from International Application No. PCT/US2019/061524, dated Jun. 8, 2020.
(Continued)

*Primary Examiner* — Armand Melendez
(74) *Attorney, Agent, or Firm* — Peter J. Ims; Westman, Champlin & Koehler, P.A.

(57) ABSTRACT

A low compressive force filament drive system for use with an additive manufacturing system includes a plurality of drives spaced from each other. Each drive includes a first rotatable shaft and a second rotatable shaft engaged with the first rotatable shaft in a counter rotational configuration. The filament drive system includes a pair of drive wheel, each fixedly attached to a shaft and comprising a groove about a circumference having a substantially smooth surface and positioned on opposing sides of a filament path with a gap therebetween so as to frictionally engage a filament provided in the filament path. The drive includes one or more bridge shafts, wherein each bridge shaft is configured to rotatably couple the adjacent drives of the plurality of drives, wherein the shafts are configured to be directly or indirectly driven by a motor. The counter rotating drive wheels pull the filament from a source and push the filament through a
(Continued)

filament feed path to a feed drive in a print head without breaking or indenting a surface of the filament.

12 Claims, 9 Drawing Sheets

Related U.S. Application Data (60) Provisional application No. 62/963,903, filed on Jan. 21, 2020, provisional application No. 62/767,294, filed on Nov. 14, 2018.

(51) Int. Cl.
*B29C 64/227* (2017.01)
*B33Y 10/00* (2015.01)
*B29K 21/00* (2006.01)
*B29C 64/209* (2017.01)
*B29K 75/00* (2006.01)
*B33Y 30/00* (2015.01)

(52) U.S. Cl.
CPC ........ *B29C 64/209* (2017.08); *B29K 2021/00* (2013.01); *B29K 2023/06* (2013.01); *B29K 2075/00* (2013.01); *B33Y 10/00* (2014.12); *B33Y 30/00* (2014.12)

(56) References Cited

U.S. PATENT DOCUMENTS

| | | | |
|---|---|---|---|
| 5,340,433 A | 8/1994 | Crump | |
| 5,503,785 A | 4/1996 | Crump et al. | |
| 6,004,124 A | 12/1999 | Swanson et al. | |
| 6,547,995 B1 | 4/2003 | Comb | |
| 6,722,872 B1 | 4/2004 | Swanson et al. | |
| 7,063,285 B1 | 6/2006 | Turley et al. | |
| 7,127,309 B2 | 10/2006 | Dunn et al. | |
| 7,384,255 B2 | 6/2008 | LaBossiere et al. | |
| 7,891,964 B2 | 2/2011 | Skubic et al. | |
| 7,910,041 B1 | 3/2011 | Priedeman, Jr. | |
| 7,938,356 B2 | 5/2011 | Taatjes et al. | |
| 8,419,996 B2 | 4/2013 | Swanson et al. | |
| 8,439,665 B2 | 5/2013 | Batchelder et al. | |
| 8,647,102 B2 | 2/2014 | Swanson et al. | |
| 8,985,497 B2 | 3/2015 | Mannella et al. | |
| 9,073,263 B2 | 7/2015 | Mannella et al. | |
| 9,108,360 B2 | 8/2015 | Comb et al. | |
| 9,321,609 B2 | 4/2016 | Koop et al. | |
| 9,512,544 B2 | 12/2016 | Heikkila | |
| 10,513,104 B2 | 12/2019 | Barclay et al. | |
| 10,513,107 B2 | 12/2019 | Flannigan et al. | |
| 2008/0213419 A1* | 9/2008 | Skubic .................... B29C 48/47 425/113 |
| 2014/0159273 A1* | 6/2014 | Koop .................... B29C 48/154 264/129 |
| 2015/0084222 A1 | 3/2015 | Heston et al. | |
| 2018/0027615 A1* | 1/2018 | Rios ....................... B23K 13/01 219/603 |
| 2018/0043627 A1 | 2/2018 | Barclay et al. | |
| 2018/0154586 A1 | 6/2018 | Wang et al. | |
| 2018/0304533 A1 | 10/2018 | Burnham et al. | |
| 2018/0345597 A1* | 12/2018 | Wilenski ................ B29C 64/20 |

FOREIGN PATENT DOCUMENTS

| | | |
|---|---|---|
| WO | 0189714 A1 | 11/2001 |
| WO | 2008100467 A1 | 8/2008 |
| WO | 2020102569 A2 | 5/2020 |

OTHER PUBLICATIONS

Communication pursuant to Rules 161(1) and 162 EPC from European Patent Application No. 19820930.6, dated Jun. 22, 2021.
First Office Action from Chinese Patent Application No. 201990001142.6 dated Dec. 9, 2021.

* cited by examiner

FILAMENT DRIVE AND LOADING METHOD FOR 3D PRINTER

CROSS REFERENCE TO RELATED APPLICATION(S)

The present application is a continuation-in-part of PCT/US2019/061524 entitled FILAMENT DRIVE MECHANISM FOR USE IN ADDITIVE MANUFACTURING SYSTEM AND METHOD OF PRINTING 3D PART that was filed on Nov. 14, 2019 and claims the benefit of U.S. Provisional Patent Application Ser. No. 62/767,294 entitled FILAMENT DRIVE MECHANISM FOR USE IN ADDITIVE MANUFACTURING SYSTEM AND METHOD OF PRINTING 3D PART that was filed on Nov. 14, 2018, the contents of all of which are incorporated by reference in their entireties.

The present application claims the benefit of U.S. Provisional Patent Application Ser. No. 62/963,903 entitled LOW PULL FORCE FILAMENT DELIVERY SYSTEM that was filed on Jan. 21, 2020, the contents of which is incorporated by reference in its entirety.

BACKGROUND

The present disclosure relates to additive manufacturing systems for printing or otherwise building 3D parts by material extrusion techniques. In particular, the present disclosure relates to loading a consumable filament feedstock into extrusion-based 3D printers Additive manufacturing, also called 3D printing, is generally a process in which a three-dimensional (3D) object is built by adding material to form a part rather than subtracting material as in traditional machining. Using one or more additive manufacturing techniques, a three-dimensional solid object of virtually any shape can be printed from a digital model of the object by an additive manufacturing system, commonly referred to as a 3D printer. A typical additive manufacturing work flow includes slicing a three-dimensional computer model into thin cross sections defining a series of layers, translating the result into two-dimensional position data, and feeding the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, Minn.), a 3D object may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is melted. The unmelted portion of the filament essentially fills the diameter of the liquefier tube, providing a plug-flow type pumping action to extrude the molten filament material further downstream through the nozzle tip. The extruded material is deposited in a continuous flow in toolpaths according to digital data based on the digital representation of a part to be printed. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

A multi-axis additive manufacturing system may be utilized to print 3D parts using fused deposition modeling techniques. The multi-axis system may include a robotic arm movable in six degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to slice a part to be built into multiple layers each printed in the same build plane, the geometry of the part may be used to determine the orientation of printing.

Whichever print system architecture is used, the printing operation for fused deposition modeling is dependent on a predictable and controlled advancement of filament into the printer and liquefier at a feed rate that will extrude material at a targeted extrusion rate. A predictable rate of rotation of filament drive wheels, and advancement of filament along a feed path without slippage, is important for maintaining print quality. Filament drives having engagement teeth are known and used for engagement and advancing filament in 3D printer, maintaining traction and achieving predictable feed rates, but will indent the filament surface and leave tic marks in the filament. This can create an undesirable build-up of filament dust in the printer, and can cause breakage of fragile filaments. Thus, there is an ongoing need for improved reliability of filament feeding and delivering in printing 3D parts with extrusion-based additive manufacturing techniques.

SUMMARY

An aspect of the present disclosure is directed to a filament drive system for use with a 3D printer. The filament drive system includes a plurality of drives spaced from each other. Each drive includes a first rotatable shaft and a second rotatable shaft engaged with the first rotatable shaft in a counter rotational configuration. Each drive includes a pair of drive wheels each fixedly attached to a shaft and each comprising a groove about a circumference having a substantially smooth surface and positioned on opposing sides of a filament path with a gap therebetween so as to frictionally engage a filament provided in the filament path. The filament drive includes one or more bridge shafts, wherein each bridge shaft is configured to rotatably couple the adjacent drives of the plurality of drives, wherein the shafts are configured to be directly or indirectly driven by a motor at a rotational rate selected to advance the filament at a desired feed rate such that each shaft rotates at the same rotational rate, such that each pair of drive wheels will coordinate to advance the filament while counter-rotating at the same rotational rate without indenting a surface of the filament.

Another aspect of the present disclosure relates a 3D printer having a filament drive system. The filament drive system includes a plurality of drives spaced from each other. Each drive includes a first rotatable shaft and a second rotatable shaft engaged with the first rotatable shaft in a counter rotational configuration, wherein the second rotatable shaft is configured to linearly move toward and away from the first rotatable shaft in a direction substantially normal to a filament path, wherein the second rotatable shaft is biased towards the first rotatable shaft with a plurality of biasing mechanisms. Each drive includes a pair of drive wheels, each comprising a groove about a circumference with a substantially smooth surface, one fixedly attached on each rotatable shaft, and positioned on opposing sides of the filament path with a gap therebetween so as to frictionally engage a filament provided in the filament path. The filament drive includes one or more bridge shafts, wherein each bridge shaft is configured to rotatably couple the adjacent drives of the plurality of drives, wherein the shafts of each of the filament drives are configured to be directly or indirectly driven by a motor at a rotational rate selected to advance the filament into the 3D printer at a desired feed rate such that each shaft rotates at the same rotational rate, such that each pair of drive wheels will coordinate to advance the filament while counter-rotating at the same rotational rate without indenting a surface of the filament.

Another aspect of the present disclosure relates to a method of loading a filament into a 3D printer. The method includes providing a source of filament and providing a filament loading drive system. The filament loading drive system includes a plurality of filament drives spaced from each other, wherein each filament drive includes a first rotatable shaft, a second rotatable shaft engaged with the first rotatable shaft in a counter rotational configuration and a pair of drive wheels, each comprising a groove about a circumference with a substantially smooth surface, one fixedly attached on each rotatable shaft, and positioned on opposing sides of a filament path with a gap therebetween so as to frictionally engage a filament provided in the filament path. The drive further includes one or more bridge shafts, wherein each bridge shaft is configured to rotatably couple adjacent drives of the plurality of filament drives, wherein each of the shafts of the plurality of filament drives is configured to be directly or indirectly driven by a single motor such that each shaft rotates at the same rotational rate. The method includes engaging the filament with the substantially smooth surfaces of the grooves in each pair of drive wheels as each pair of drive wheels counter rotate such that the filament is pulled from the source of the filament and pushed through a filament feed path without indenting a surface of the filament.

Definitions

Unless otherwise specified, the following terms as used herein have the meanings provided below:

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

The term "substantially smooth" when used with respect to the surfaces of the channels of the counter-rotating drives means that the surfaces are substantially flat, arcuate and combinations of flat and arcuate surfaces. Substantially smooth surfaces do not include raised surfaces that are non-parallel to a direction of travel of the filament, where the raised surfaces are located in a position within the channels where the raised surfaces are capable of engaging, indenting or deforming the filament.

DETAILED DESCRIPTION

The present disclosure is directed to a filament loading drive system for advancing filament feedstock materials from a consumable supply to a feed drive at or near a liquefier or print head of a fused deposition modeling additive manufacturing system or 3D printer. The filament loading drive system is typically located proximate a source of filament where the loading drive system pulls filament from the source and pushes the filament through a feed path toward the print head.

The filament loading drive is configured to engage the filament without slippage but applying low compressive forces, employing multiple driven pairs of smooth, counter-rotating filament drives. Each filament drive comprises a pair of grooved drive wheels, where the grooves extend about a circumference of the wheels and have substantially smooth surfaces configured to engage the filament without puncturing its surface or leaving tic marks. The drive wheels are biased towards one another, and the substantially smooth surfaces of the grooves therein grip the filament and drive the filament along the feed path. The biasing forces are sufficiently low as to not indent or deform the filament, thus enabling the feeding of brittle and soft filaments without fracturing, breaking, crumbling or compressing the filament. The filament loading drive system of the present invention, by applying relatively low localized compressive forces on the filament, the stress subjected upon the filament is reduces, that can cause it to fracture or break. While disclosed as a loading drive, the drive can be utilized in any location along the feed path.

In some embodiments, the filament drive is located proximate a source of the filament feedstock, which typically is wound onto a rotating spool but may also be wrapped in a spool-less configuration. As discussed in the present disclosure the exemplary 3D printer retains the filament source or sources in bays located below the print chamber. However, the source of the filament can be located in any suitable location including locations along the sides of the chamber, above the chamber and a location external to the printer. Regardless of the filament location source, in some embodiments the loading drive is located proximate the source of the filament feed stock to minimize the pull force, and therefore tensile stress, on the filament as the filament is pulled from the source and into the filament path by the loading drive.

Prior art filament drives create tics marks in the outer filament surface, representing points of traction by a series of drive teeth. The present invention avoids creating tics in the outer surface of filament by eliminating drive teeth, and likewise avoids the scraping off or shaving of filament from the filament engaged in the filament drive. Filament pieces or shavings tend to cause undesirable filament buildup in the printer. Filament buildup degrades or can potentially damage the printer or adversely affect its performance, and reducing print quality. Engagement of the filament by smooth, grooved drive wheels substantially avoids instances of shaving or chipping away portions of the filament. As a result, the filament loading drive of the present invention is better able to control the loading and delivery of the filament.

The filament loading drive applies a force to the filament that advances the filament from a consumable supply source through a flexible guide tube that defines the feed path which leads to a filament feed drive carried by or associated with a print head. The filament loading drive is separate from the print head drive. The print head feed drive engages and advances the filament from the guide tube and drives the filament into a liquefier which typically is a component of the print head. In the liquefier, the filament is heated to a molten state and into a melt pool. Driving the unmelted filament into the melt pools acts like a piston such that the molten material is extruded with plug flow from an extrusion nozzle downstream of the liquefier in the print head. The print head feed drive controls the flow rate through the extrusion nozzle.

In some embodiments, the feed path includes a telescoping joint or accumulator to compensate for differing feed rates between the loading drive and the filament feed drive. In some embodiments, the telescoping joint or accumulator is located in the feed path proximate the filament feed drive to limit the tensile or pull forces placed on the filament by the print head feed drive.

Figure 1:
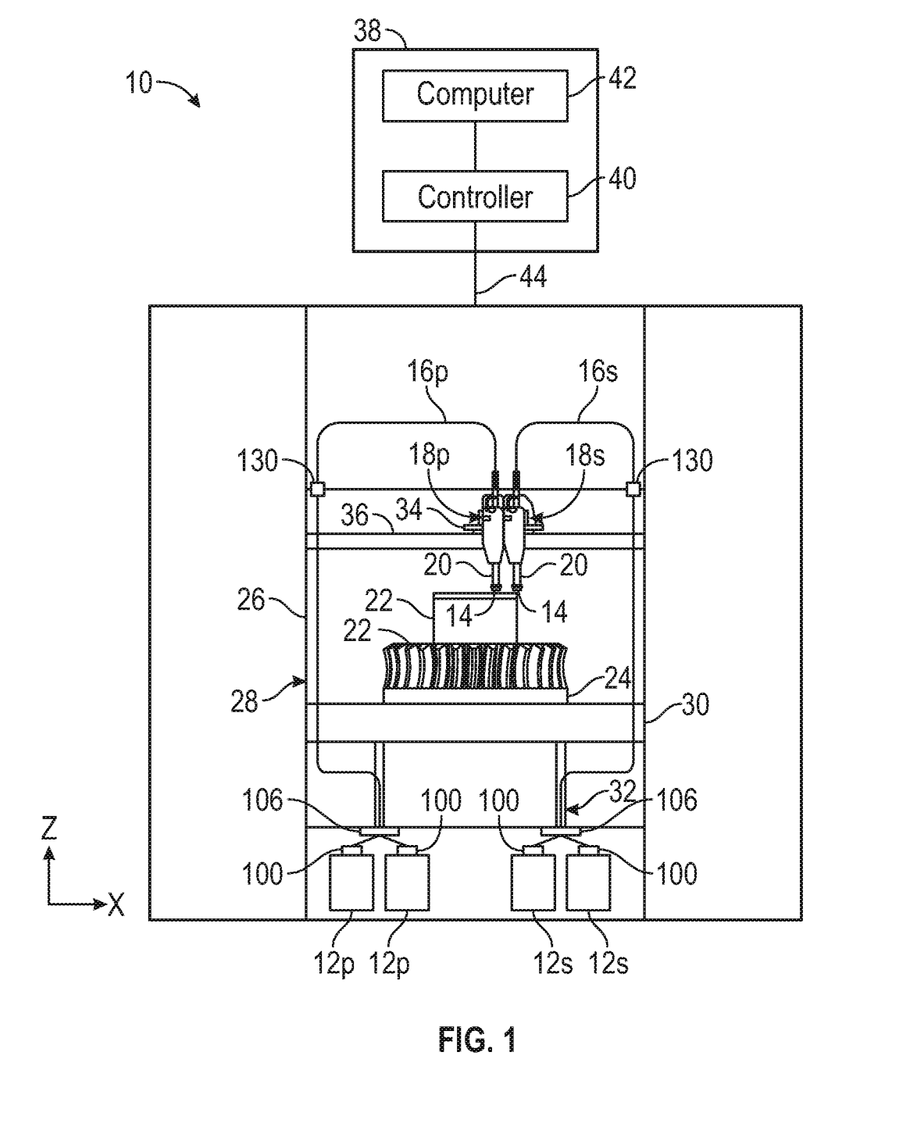
FIG. 1 is a front schematic view of an extrusion based additive manufacturing system, which utilizes a filament drive mechanism of the present disclosure.

The present disclosure may be used with any suitable extrusion-based 3D printer. For example, FIG. 1 illustrates an exemplary 3D printer 10 that has a substantially horizontal print plane where the part being printed and indexed in a substantially vertical direction as the part is printed in a layer by layer manner using two print heads 18$p$ for part material and 18$s$ for support material. The illustrated 3D printer 10 uses four consumable assemblies, two consumable assemblies 12$p$ for part material and two consumable assemblies 12$s$ for support material. Each consumable assembly 12$p$ and 12$s$ is an easily loadable, removable, and replaceable supply devices such that two supplies of a consumable filament of part material and two supplies of consumable material for support material can be retained and utilized in a single 3D printer 10. All of the consumable assemblies 12$p$ and 12$s$ may be identical in structure or different in structure. Each consumable assembly 12 may retain the consumable filament on a wound spool, a spool-less coil, or other supply arrangement, such as discussed for example in Turley et al. U.S. Pat. No. 7,063,285; Taatjes at al., U.S. Pat. No. 7,938,356; and Mannella et al., U.S. Pat. Nos. 8,985,497 and 9,073,263. While four assemblies are illustrated, the present disclosure is not limited to a 3D printer with four assemblies. Rather, the 3D printer of the present disclosure can utilize any number of assemblies including two or more assemblies containing the same or different consumable materials.

A loading drive 100 for each consumable assembly 12$p$ and 12$s$ is schematically illustrated in FIG. 1. Locating the loading drive 100 proximate the consumable assembly 12$p$ or 12$s$ aids in minimizing the tensile stresses or pull forces exerted on the filament by the loading drive as the filament is removed from the assembly 12$p$ or 12$s$. The further the distance of the pull drive from the consumable assemblies, the more pull force must be applied to load it into the system.

Figure 2:
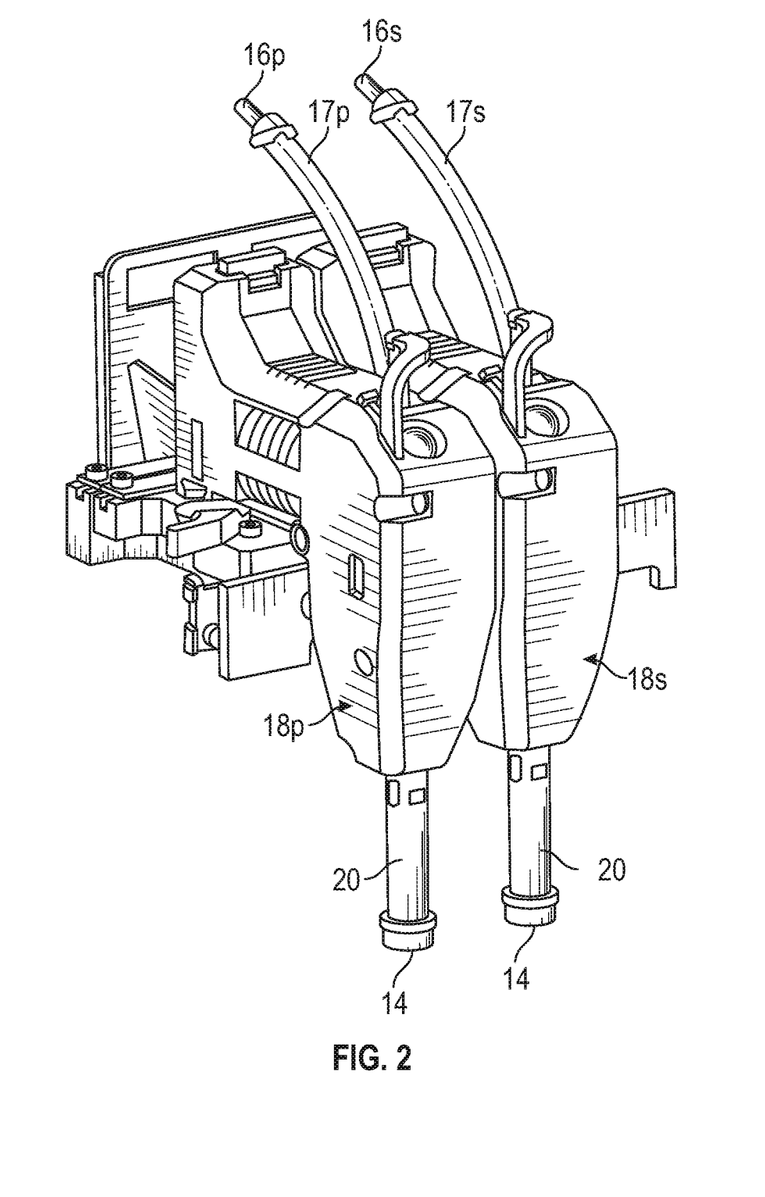
FIG. 2 is a view of a pair of print heads on a head carriage.

As shown in FIG. 2, each print head 18$p$ and 18$s$ is a device comprising a housing that retains a liquefier 20 having a nozzle tip 14. A filament feed path 16$p$ and 16$s$ interconnects each consumable assembly 12$p$ and 12$s$ and print head 18$p$ and 18$s$, and provides a filament feed path from the filament supply to the print head, where the filament feed paths 16$p$ and 16$s$ are substantially sealed from ambient conditions. Upper ends of feed path 16$p$ and 16$s$ can be attached to the print heads 18$p$ and 18$s$ using end piece 17$p$ and 17. In the illustrated embodiment, the end piece 17$p$ and 17$s$ is sufficiently rigid to retain an arcuate configuration of the feed path 16$p$ and 16$s$ with a radius that prevents the filament from bending too sharply which can cause the filament to break or crease, and will increase the frictional drag and pull force experienced by the filament.

Exemplary 3D printer 10 prints parts or models and corresponding support structures (e.g., 3D part 22 and support structure 24) from the part and support material filaments, respectively, of consumable assemblies 12, by extruding roads of molten material along toolpaths. During a build operation, successive segments of consumable filament are driven into print head 18 where they are heated and melted in liquefier 20. The melted material is extruded through nozzle tip 14 in a layer-wise pattern to produce printed parts. Suitable 3D printers 10 include fused deposition modeling systems developed by Stratasys, Inc., Eden Prairie, Minn. under the trademark "FDM".

As shown, the 3D printer 10 includes system cabinet or frame 26, chamber 28, platen 30, platen gantry 32, head carriage 34, and head gantry 36. Cabinet 26 may include container bays configured to receive consumable assemblies 12p and 12s. In alternative embodiments, the container bays may be omitted to reduce the overall footprint of 3D printer 10. In these embodiments, consumable assembly 12 may stand proximate to printer 10.

Chamber 28 contains platen 30 for printing 3D part 22 and support structure 24. Chamber 28 may be an enclosed environment and may be heated (e.g., with circulating heated air) to reduce the rate at which the part and support materials solidify after being extruded and deposited (e.g., to reduce distortions and curling). In alternative embodiments, chamber 28 may be omitted and/or replaced with different types of build environments. For example, 3D part 22 and support structure 24 may be built in a build environment that is open to ambient conditions or may be enclosed with alternative structures (e.g., flexible curtains).

Platen 30 is a platform on which 3D part 22 and support structure 24 are printed in a layer-by-layer manner, and is supported by platen gantry 32. In some embodiments, platen 30 may engage and support a build substrate, which may be a tray substrate as disclosed in Dunn et al., U.S. Pat. No. 7,127,309 and Flannigan et al., U.S. Pat. No. 10,513,107, fabricated from plastic, corrugated cardboard, or other suitable material, and may also include a flexible polymeric film or liner, painter's tape, polyimide tape, or other disposable fabrication for adhering deposited material onto the platen 30 or onto the build substrate. Platen gantry 32 is a gantry assembly configured to move platen 30 along (or substantially along) the vertical z-axis.

Head carriage 34 is a unit configured to receive and retain print heads 18p and 18s, and is supported by head gantry 36. In the shown embodiment, head gantry 36 is a mechanism configured to move head carriage 34 (and the retained print heads 18p and 18s) in (or substantially in) a horizontal x-y plane above platen 30. Examples of suitable gantry assemblies for head gantry 36 include those disclosed in Swanson et al., U.S. Pat. No. 6,722,872; and Comb et al., U.S. Pat. No. 9,108,360, where head gantry 36 may also support deformable baffles (not shown) that define a ceiling for chamber 28. Head gantry 36 may utilize any suitable bridge-type gantry or robotic mechanism for moving head carriage 34 (and the retained print heads 18), such as with one or more motors (e.g., stepper motors and encoded DC motors), gears, pulleys, belts, screws, robotic arms, and the like.

In an alternative embodiment, platen 30 may be configured to move in the horizontal x-y plane within chamber 28, and head carriage 34 (and print heads 18p and 18s) may be configured to move along the z-axis. Other similar arrangements may also be used such that one or both of platen 30 and print heads 18p and 18s are moveable relative to each other. Platen 30 and head carriage 34 (and print heads 18) may also be oriented along different axes. For example, platen 30 may be oriented vertically and print heads 18p and 18s may print 3D part 22 and support structure 24 along the x-axis or the y-axis.

Figure 2A:
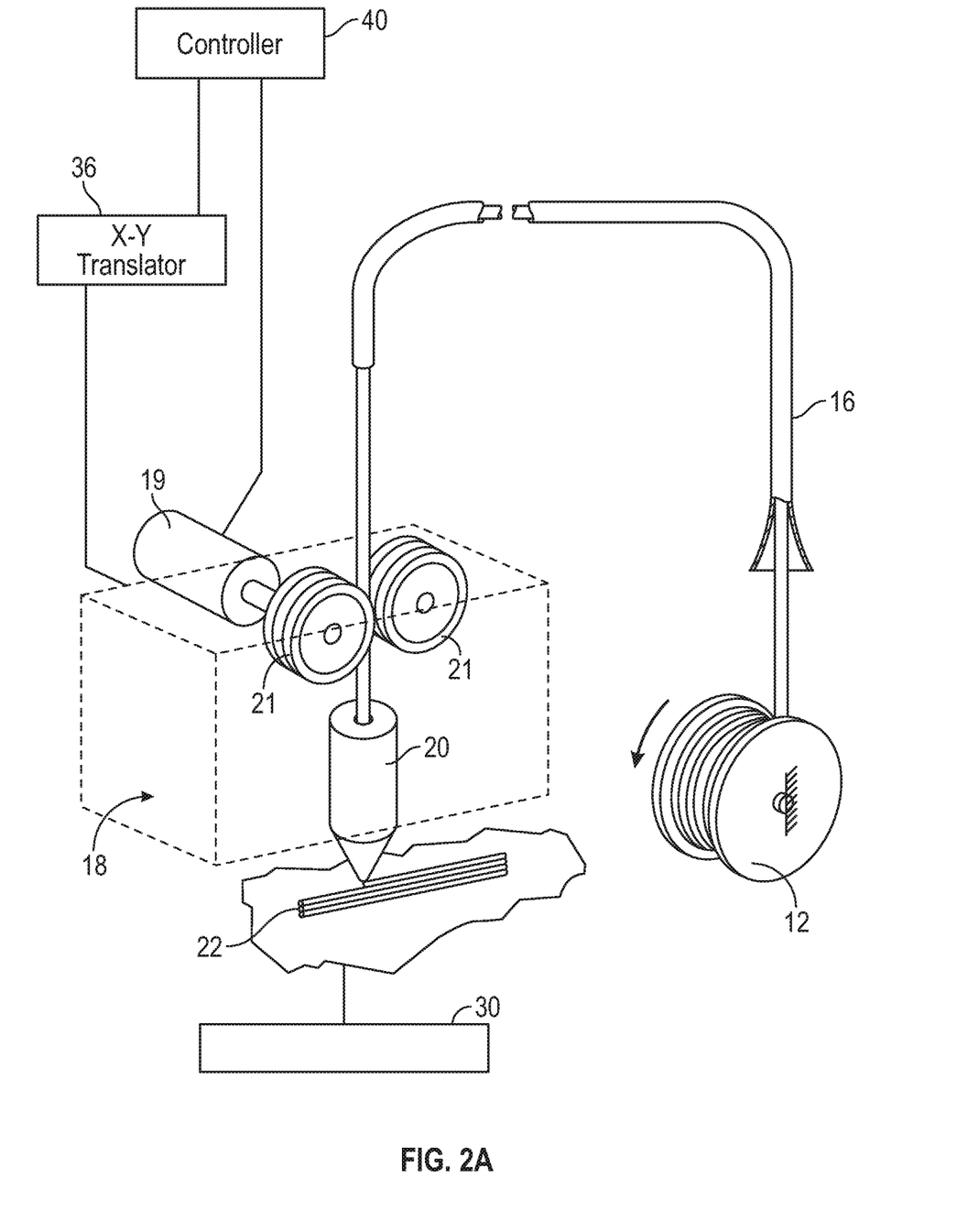
FIG. 2A is a schematic view of a feed head drive

FIG. 2 illustrates an example embodiment of two print heads 18p and 18s which include the filament delivery system of the present disclosure. The shown print heads 18p and 18s are similarly configured to receive a consumable filament, melt the filament in liquefier 20 to product a molten material, and extrude the molten material from a nozzle tip 14 of liquefier 20. A motor within each print head is configured to receive power from printer 10 via electrical connections for rotating a threaded-surface gear of motor. The rotating gear of motor 19 engages a feed drive 21 to convey rotational power to the filament 17 and drive the filament 17 into the liquefier 20, as illustrated in FIG. 2A. The feed drive 21 is illustrated as a single counter-rotating drive. However, a Quad drive or a Hex drive as described in Stratasys PCT Patent Application No. PCT/US2019/061524 are also within the scope of the present disclosure for the feed drive 21. Motor 19 may be encased within print head 18 or may be a component of printer 10. Examples of suitable liquefier assemblies for print head 18 include those disclosed in Swanson et al., U.S. Pat. No. 6,004,124; and Batchelder et al., U.S. Pat. No. 8,439,665. In additional embodiments, in which print head 18 is an interchangeable, single-nozzle print head, examples of suitable devices for each print head 18, and the connections between print head 18 and head gantry include those disclosed in Swanson et al., U.S. Pat. Nos. 8,419,996, 8,647,102; and Barclay et al., U.S. Pat. No. 10,513,104.

In order to compensate for different rates at which a common filament is driven by the loading drive 100 and the feed drive 21, the feed paths 16p and 16s may utilizing an accumulator 130 that allows a length of the feed path to expand and contract. A typical accumulator 130 includes a telescoping joint.

3D printer 10 also includes controller assembly 38, which may include one or more control circuits (e.g., controller 40) and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to system 10.

Controller assembly 38 may communicate over communication line 44 with print heads 18, filament drive mechanisms, chamber 28 (e.g., with a heating unit for chamber 28), head carriage 34, motors for platen gantry 32 and head gantry 36, and various sensors, calibration devices, display devices, and/or user input devices. In some embodiments, controller assembly 38 may also communicate with one or more of platen 30, platen gantry 32, head gantry 36, and any other suitable component of 3D printer 10. While illustrated as a single signal line, communication line 44 may include one or more electrical, optical, and/or wireless signal lines, which may be external and/or internal to 3D printer 10, allowing controller assembly 38 to communicate with various components of 3D printer 10.

During operation, controller assembly 38 may direct platen gantry 32 to move platen 30 to a predetermined height within chamber 28. Controller assembly 38 may then direct head gantry 36 to move head carriage 34 (and the retained print heads 18) around in the horizontal x-y plane above chamber 28. Controller assembly 38 may also direct print heads 18 to selectively advance successive segments of the consumable filaments from consumable assembly 12 through guide tubes 16 and into the liquefier 20.

In some embodiments, the present disclosure includes a filament delivery system that is used to deliver a fragile filament composition, such as highly loaded and/or brittle filament, from a source to a print head such that the filament encounters 0.5 lbs of pull force or less.

Figure 3:
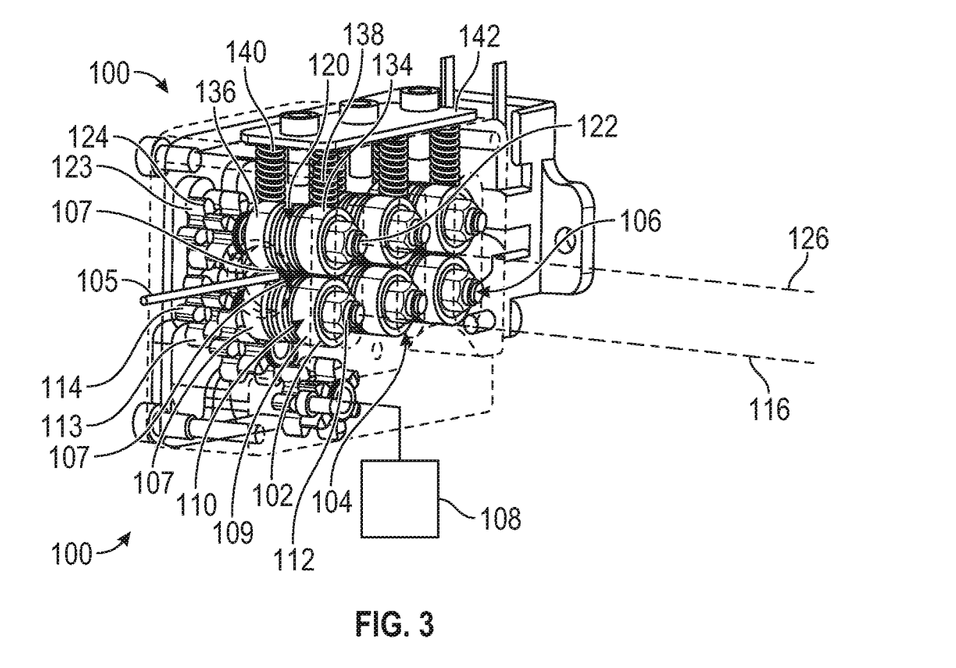
FIG. 3 is a first perspective view of a filament drive for use in a 3D printer.
Figure 4:
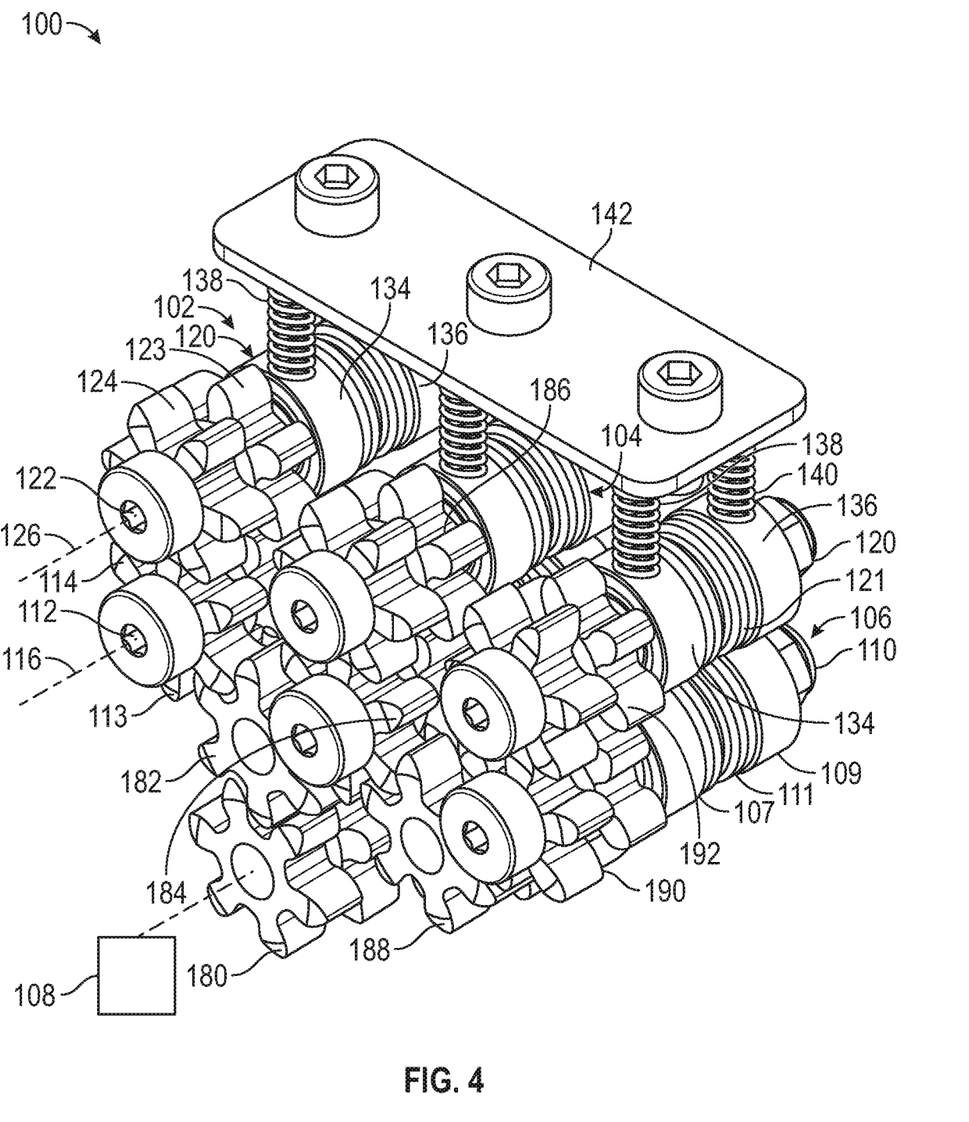
FIG. 4 is a second perspective view of the filament drive for use in a 3D printer.
Figure 5:
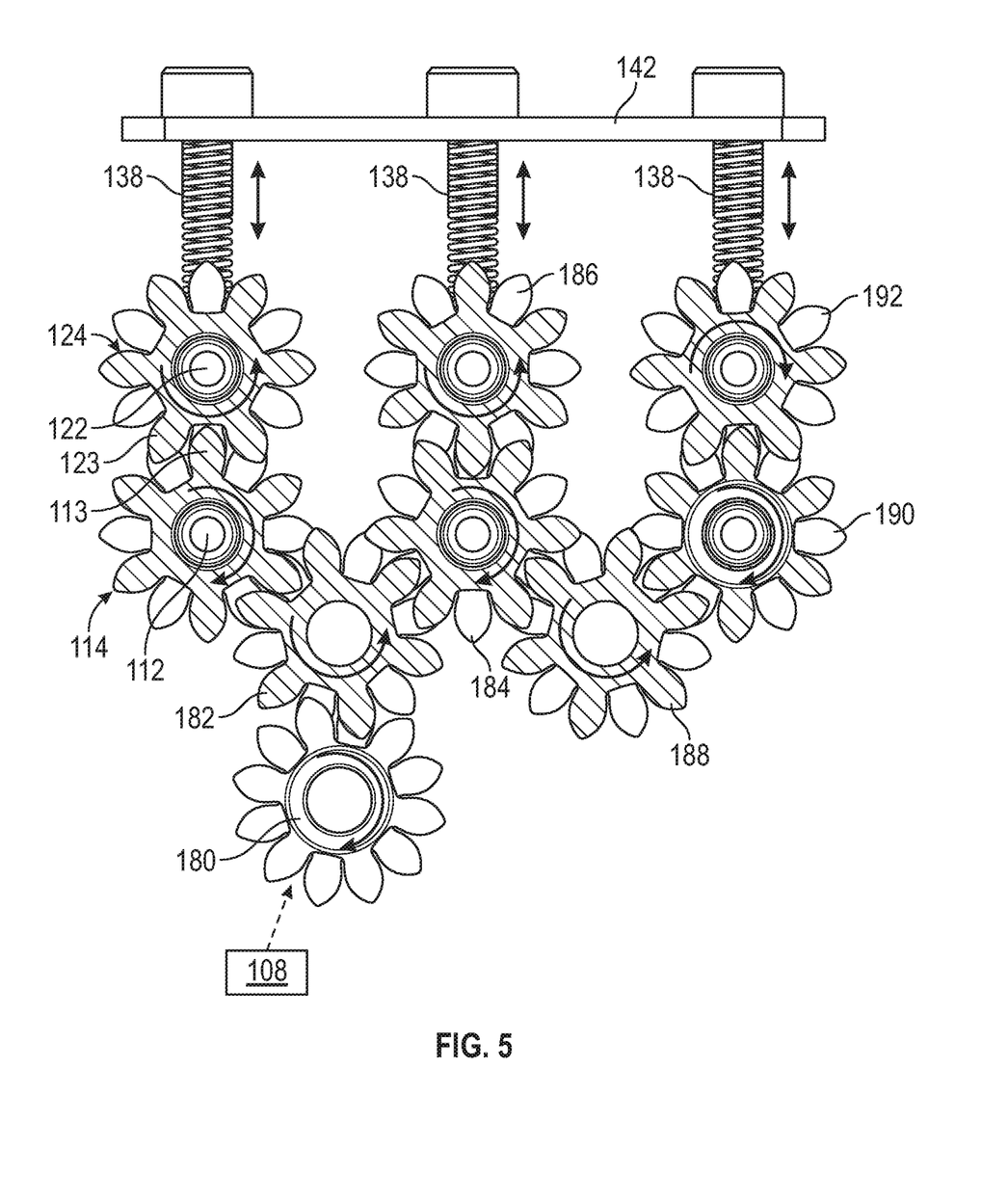
FIG. 5 is a sectional view of the filament drive for use in a 3D printer.

Referring to FIG. 3, the low compressive force loading drive 100 is described. A casing 200 surrounds and supports the loading drive 100, where the casing 200 is configured to be attached to the consumable assemblies 12$p$ and 12$s$. In some embodiments, the casing 200 is substantially sealed to prevent ambient conditions from affecting the filament properties.

Referring to FIGS. 3-6, the loading drive 100 includes a plurality of counter-rotating drives 102, 104 and 106 that are in series and define a filament path 107 for a filament 105. Each drive applies a compressive force on opposing sides of the filament using counter-rotating drive wheels to force the filament into the feed path 16$p$ or 16$s$. By engaging the filament 105 with multiple drives in series, the frictional force on the filament 105 is increased, which allows the loading drive 100 to engage and move the filament 105 with a low compressive force without deforming the filament 105.

The counter-rotating members of each plurality of drives 102, 104 and 106 have concave grooves about a circumference of each opposing drive wheel, wherein the surfaces of the grooves are substantially smooth and are configured to apply the compressive force on the filament to create friction to drive the filament into the feed path 16$p$ or 16$s$. As illustrated, the grooves in the opposing drive wheel have a radius which can accommodate the radius of the filament so as to optimize the contact area while preventing deformation of the filament, which provides a driving force on the filament. However, other configurations where the contact of the counter rotating drive wheels with the filament is with a substantially smooth surface are also contemplated including, but not limited to a V shaped groove and a trapezoidal shaped groove.

While applying the compressive driving force, the members of the drives 102, 104 and 106 do not deform or indent the filament 105, as it has been discovered that applying any sort of surface marking or indentation to a fragile filament creates demarcations, and potential stress fracture sites. While it is often preferred to use drive wheels which incorporate teeth into the drive wheel surfaces, to deliver more forceful push force into the filament path, drive wheels with teeth deliver highly localized pressure points into the surface of the filament. These demarcations ultimately induce fissures and cracks which cause the filament to break inside the printer before it reaches the print head, resulting in print failure. Experimentation has shown that subjecting highly filled or fragile filament compositions to more than 3 pounds of force can result in damage.

As such, the loading drive 100 of the present disclosure utilizes a biasing mechanism to allow one of the opposing members of each drive 102, 104 and 106 to move relative to the other opposing member to continue to apply a compressive force on the filament 105 without exceeding a maximum compressive force threshold for each drive wheel. The use of more than one set of drive wheels is needed, when using substantially smooth drive wheels, because it cannot supply as much drive force as that of toothed wheels. Toothed wheels apply more than 3 pounds of localized push force onto the surface of filament, while causing indents to be formed.

Each of the counter rotating drives 102, 104 and 106 are similarly constructed. As such, only one of the drives 102 will be described in detail. The counter-rotating drive 102 includes a first counter-rotating drive wheel 110 that is fixedly retained to a first drive shaft 112. The first drive shaft 112 is fixedly attached to a first gear 114 that is directly or indirectly driven by a motor 108. The drive shaft 112 is retained in a fixed location and is configured to rotate about an axis of rotation 116. The first counter-rotating drive wheel 110 is retained within the casing 200 by spaced apart sleeves or bearings 109 and 107, which allow the drive wheel 110 to rotate therein while preventing erosion or wear on casing 200 by the drive wheel 110, which is typically constructed of a hardened metal material or coated with a hardened metal material, such as but not limited to carbide. The hardened metal material prevents wear on the first drive wheel 10 due to engagement with the highly loaded filament 105.

As illustrated, the drive 100 includes three counter rotating drives. However, the present disclosure is not limited to three drives. Rather the number of drives can include one or more drives where the number of drives is determined by the force required to move the filament in the filament path, the compressive force the filament can withstand with fracturing or developing stresses that would result in fracturing in the filament path The counter-rotating drive 102 includes a second counter-rotating drive wheel 120 that is fixedly attached to a second drive shaft 122. A second gear 124 is fixedly attached to the second drive shaft 122 where cogs 123 on the second gear 122 intermesh with cogs 113 on the first gear to cause the first and second drive wheels 110 and 120 to counter-rotate and frictionally engage the filament 105. The second drive wheel 120 and the second gear 124 and the second shaft rotate about an axis of rotation 126.

Figure 6:
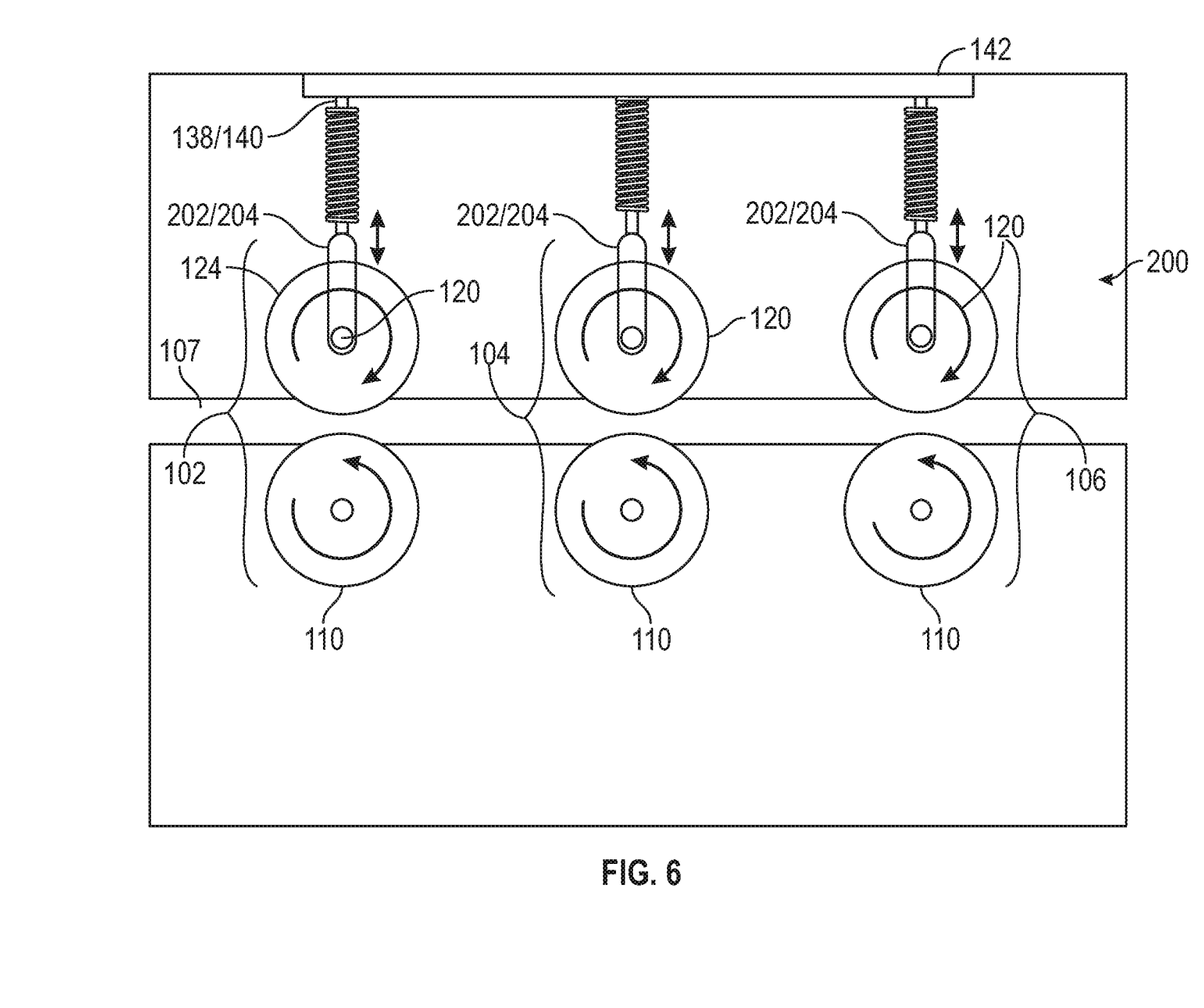
FIG. 6 is a schematic view of the filament engaging members of the filament drive for use with a 3D printer

A location of the axis of rotation 126 of the second drive shaft 122 is not fixed, which allows a distance between the first counter-rotating drive wheel 110 and the second counter-rotating drive wheel 120 to accommodate changes in diameter of the filament without applying excessive compressive forces. The casing 200 includes slots 202 and 204 (as best illustrated in FIG. 6) that engage opposite ends of the second drive shaft 122, wherein the second drive shaft 122 can travel a length of the slots 202 and 204. The slots 202 and 204 are aligned substantially normal to a filament path 107 through the casing 200 to maintain alignment of the compressive force on the filament 105 by the counter-rotating drive 102.

By way of non-limiting example, due to the movement of the second drive shaft 122 relative to the first drive shaft 112, the drive 102 can accommodate a filament with a nominal 0.070 inch diameter with a variation of +0.002 inches, or a variation of about 3.0%, while subjecting the filament surface to less than 3 pounds of push force while effectively driving it forward. The disclosed diameters, compressive forces and variations can be changed to accommodate different sized filaments and printers, while the loading drive 104 maintains the same functionality.

The second counter-rotating drive wheel 120 is retained within sleeves or bearings 134 and 136 on opposing ends of the drive wheel 120. The sleeves or bearings 134 and 136 prevent or minimize the ability of the second counter-rotating drive wheel 120 movement from causing wear or erosion of the casing 200.

Spaced apart compression springs 138 and 140 are attached to the sleeves or bearings 134 and 136 and to a plate 142 on the drive 100. The plate 142 is constructed of a rigid material, such as metal, that can withstand the forces of the springs 138 and 140 without bending or flexing to maintain a desired amount of biasing force on the second member 120, which in turn applies a desired amount of force on the filament to drive the filament into the filament path 16$p$ or 16$s$.

As mentioned above, a filament can have variations in diameter, where the second member 120 is allowed to move due to the second drive shaft 122 being retained within the slots 202 and 204 and the compression springs 138 and 140 maintain a desired amount of frictional forces on the filament of varying diameter. Additionally, the space apart springs 138 and 140 maintain the alignment of the second drive wheel 120 relative to the first drive wheel 110. If a single spring were utilized, the second drive wheel 120 could become askew from the first drive wheel 110 and not provide the necessary frictional force needed to drive the filament 105 into the filament path 16*p* or 16*s*.

In the present disclosure, the motor 108 drives a drive gear 180 having the same construction as the gear 114. The drive gear 180 drives a bridge gear 182 that engages gears 114 and 184. Gear 114 engages and counter-rotates with gear 124 and gear 184 engages and counter rotates with gear 186. Bridge gear 188 engages and counter rotates with respect to the gear 184 where bridge gear 188 engages gear 190. Gear 190 engages and counter rotates with gear 192.

As illustrated a single motor 108 causes each of the drives 102, 104 and 106 to synchronously engage the filament using the disclosed gear train. However, other gear trains are within the scope of the present disclosure including locating the drive on one of the bridge gears 182 or 188 or one of the stationary gears 114, 184 or 190. Multiple driven wheels helps to facilitate auto-feeding of the filament into and through the drive 100.

Figure 7:
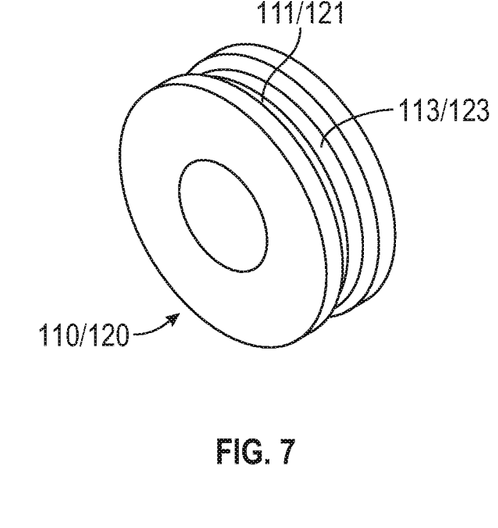
FIG. 7 is a perspective view of a counter-rotating member of a filament drive.
Figure 8:
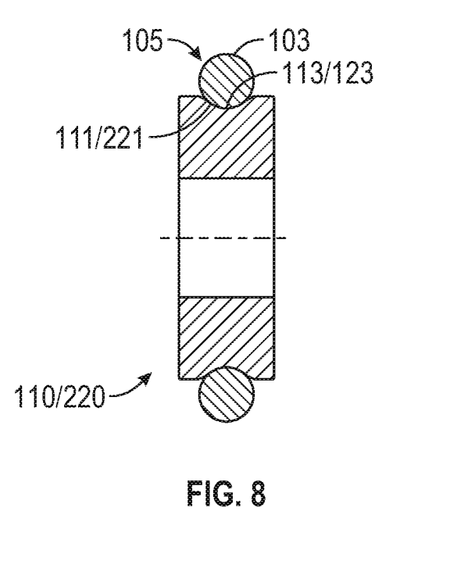
FIG. 8 is sectional view of the counter-rotating member of FIG. 7 engaging a filament.

Referring to FIGS. 7 and 8, each counter rotating engaging drive wheels 110 and 120 are similarly constructed. Each drive wheel 110 and 120 includes a concave groove 111 and 121 that has a surface 113 and 123 having a radius which can accommodate the nominal radius 103 of the filament 105. In one embodiment, the radius of the surfaces 113 and 123 can be similar to that of the nominal radius 103 of the filament 105. In alternative embodiments, it can be larger than the radius 103 of the filament 105, so as the printer can accommodate a variety of filament diameter sizes. Having surfaces 113 and 123 with a radius similar to that of the nominal radius 103 of the filament 105, increases surface contact area and therefore improves the localized frictional driving force between the drive wheels 110 and 120, which aids in pushing the filament without deforming, indenting or otherwise demarcating the filament surface. However, other configurations of the substantially smooth surfaces can also be utilized, as mentioned above.

Figure 9:
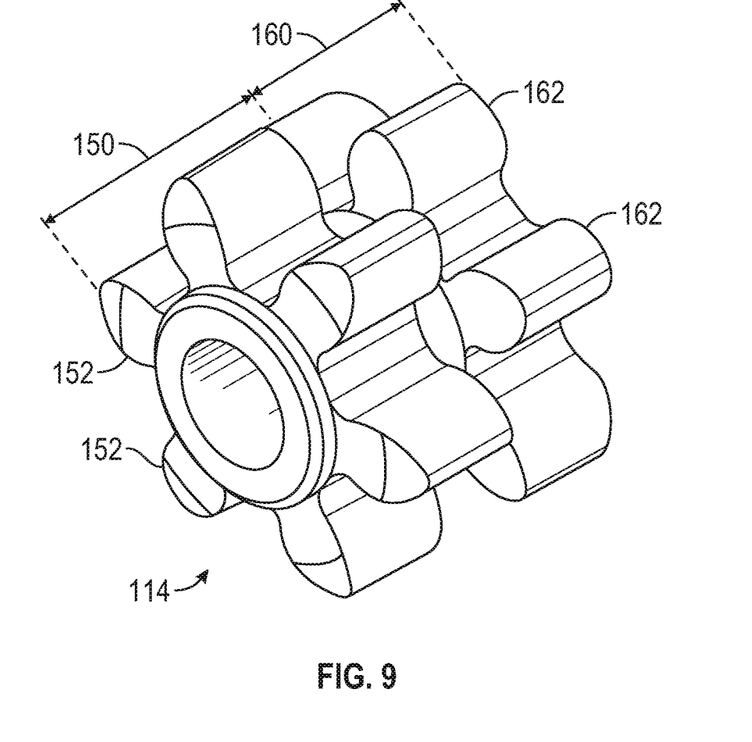
FIG. 9 is a perspective view of a gear for the filament drive.
Figure 10:
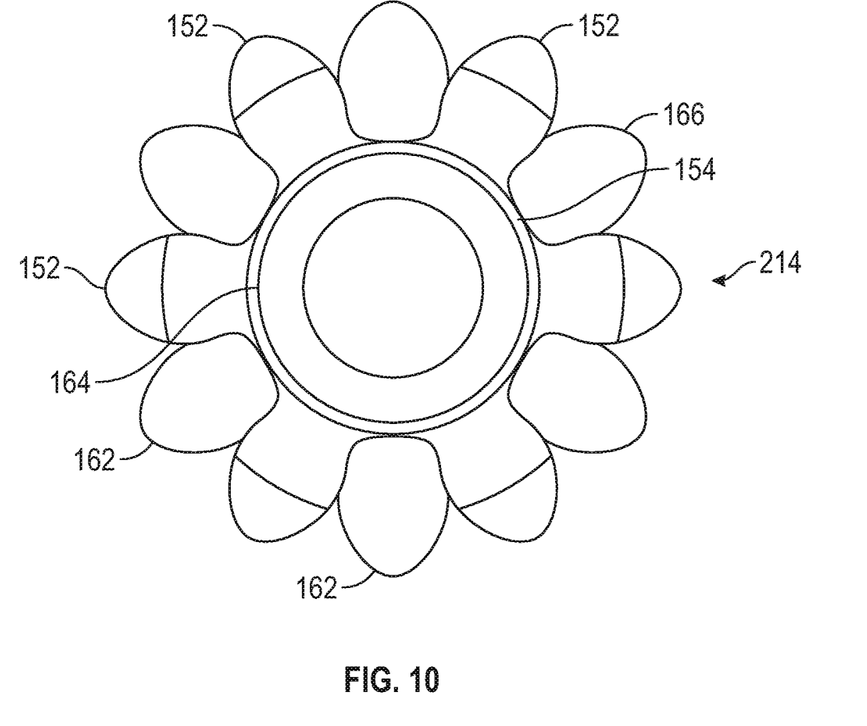
FIG. 10 is a front view of the gear of FIG. 9.

Because the second drive shaft 122 moves relative to the first drive shaft 112, the present disclosure utilizes gears 114 and 124 that are similarly constructed but include offset cogs to increase the surface area of contact, which in turn increases the reliability of the loading drive 101. Referring to FIGS. 9 and 10, an exemplary gear for gear 114 and 124 is illustrated where gear 114 will be described in detail.

The gear 114 is of a monolithic or one-piece construction and has a first portion 150 having a first plurality of cogs 152 and a second portion 160 with a second plurality of cogs 162. The first plurality of cogs 152 and the second plurality of cogs 162 are substantially out of phase, where a valley 154 in the first plurality of gods 152 is substantially aligned with a peak 166 on the second plurality of cogs 162. Similarly, a valley 164 in the second plurality of cogs 162 is substantially aligned with a peak 156 in the first plurality of cogs 152.

Utilizing the gears 114 and 124 with the same construction having the first and second portions 150 and 160 with the out of phase cogs 152 and 162 increases the surface area between the cogs 152 and 162 which aids in providing reliability to the rate at which the filament is driven while the second engaging member 120 moves relative to the first engaging member 110.

The filament delivery systems of the present disclosure can be used to advantage with filament formed of any of a variety of materials, but are particularly suitable for use in feeding fragile filament materials, such as filament containing fillers or filament having a low durometer, that have a lower tensile strength or that are otherwise challenging to feed using typical filament drive mechanisms and delivery systems of the prior art.

A filled or bound particle filament may be formed of metal, ceramic, mineral, glass bubbles, glass spheres or combinations and mixtures of such particulates in a polymeric matrix. Bound particle filaments are described, for example, in Heikkila U.S. Pat. No. 9,512,544. As described therein, an exemplary bound filament is comprised of about 1-70 wt. % of a thermoplastic polymer; and about 30-99 wt. % of a particulate dispersed in the polymer, the particulate having a particle size of less than 500 microns, and being configured to achieve a dense packing of particle distribution. Other types of particulate filaments include composite filaments such as are described in Priedeman U.S. Pat. No. 7,910,041. As described therein, nanofibers are added to a carrier material to manipulate the properties of the filament. A bound particle filament is more rigid than a typical fused deposition modeling filament, and has been demonstrated to slip against the drive wheels used to feed softer filaments.

Low durometer materials include, but are not limited to, elastomeric materials, polyurethanes, polyesters, polyethylene block amides, silicone, rubber, vulcanates and combinations thereof. Such low durometer materials tend to have tacky surfaces so that the materials have a generally high coefficient of friction relative to typical materials used for fused deposition modeling 3D printing, such as ABS, PC, and PLA. The elasticity, reduced stiffness and tackiness of the low durometer materials has been found to cause feed-rate errors, jams, and inaccurate extrusion rates in the print heads of the prior art, as the low durometer filament tends to stretch, slip, kink, tear, crumble and/or jam in the prior art filament drive mechanisms.

Depending upon the fragility of the filament material selected, the amount of compression applied by the low compressive force loading drive of the present disclosure can be applied in combination with the selection of number of drive wheels. The more drive wheels used, the more surface contact made, and the less compressive force needed by any one set of drive wheels. Particularly fragile materials benefit from having more drive wheels, and less compressive force application to the surface (less demarcation damage potential to the surface). For less fragile filament materials, more compressive force can be applied to the surface without demarcation damage, and fewer drive wheels can be used, or the surface texture of the drive wheels can be roughened, textured, made non-smooth, or utilize teeth for better "grab" or drive application to the filament passing through the drive path.

By way of example, a filament such as that using PEKK as a binder mixed with chopped carbon fiber as a fill material, or POM with metal or ceramic particulates, or unfilled TPU elastomers all may be considered to be fragile in nature. The higher the level of particulates, the weaker the overall filament structure will be when subjected to pull force. The more elastomeric the TPU material, the more stretchy or relaxed it will become when subjected to pull force. Fragile filament, while relatively weak in tensile pull strength, is relatively strong in compressive strength and can withstand about to about 3 lbs without yielding to deformation. Knowing the force at which the filament yields, the springs 238 and 240 with a relatively lower force can be utilized, such as about 3.0 lbs of compressive force. Maintaining the compressive force below the yield force prevents deformation of the filament, which prevents deformation and loss of strength.

EXAMPLE

The present disclosure is more particularly described in the following examples that are intended as illustrations only, since numerous modifications and variations within the scope of the present disclosure will be apparent to those skilled in the art.

Example 1

The filament loading system of the present invention was installed in a Stratasys® F370™ 3D printer manufactured by Stratasys, Inc. of Eden Prairie, Minn. The feed drive was a Quad drive as described in Stratasys PCT Patent Application No. PCT/US2019/061524. The loading drive was a low compressive force Hex drive as shown in FIGS. 11-16 herein.

Test parts were successfully printed using a bound metal particle filament having a 0.068"+/−0.020" diameter. The filament material composition tested is a stainless steel-filled polyoxymethylene (POM) thermoplastic part material, loaded at 72 vol. % stainless steel/28 vol. % POM. The filament is characterized as a fragile filament, having a low tensile strength and brittleness.

Measured mechanical properties of the filament: Tensile yield strength of approximately 600 psi, which results in a breaking force of approximately 2.25 lbs. Compressive yield strength of approximately 6 lbs. compressive force.

Filament loading system design constraints used for printing this filament: Print head pull force limit of 0.5 lbs. applied by the feed drive. Compressive force limit of 3 lbs. applied by the loading drive onto the filament (designed at 50% of filament yield strength). This provided approximately 1.5 lb of push force. This resulted in the successful printing of a part with the highly loaded filament.

The same filament material was run in an unmodified, commercially-available Stratasys® F370™ 3D printer and did not successfully print parts. The filament was observed to fracture and break in the feed path.

Although the present disclosure has been described with reference to preferred embodiments, workers skilled in the art will recognize that changes may be made in form and detail without departing from the spirit and scope of the disclosure.

The invention claimed is:

1. A filament drive system for use with a 3D printer, the filament drive system comprising:
a plurality of filament drives spaced from each other, each filament drive comprising:
a first rotatable shaft;
a second rotatable shaft engaged with the first rotatable shaft in a counter rotational configuration;
a pair of drive wheels, each of the pair of drive wheels comprising a groove about a circumference with a substantially smooth surface, one fixedly attached on each rotatable shaft, and positioned on opposing sides of a filament path with a gap therebetween so as to frictionally engage a filament provided in the filament path; and
a plurality of biasing mechanisms, wherein at least one of the plurality of biasing mechanism is configured to bias each second rotatable shaft toward the first rotatable shaft, wherein the plurality of biasing mechanisms comprises a first compression spring and a second compression spring, the first and second springs engaging the second shaft on opposite sides of the groove with the springs normal to the axis of the second shaft to maintain alignment of the first and second shafts; and
one or more bridge shafts, wherein each bridge shaft is configured to rotatably couple adjacent drives of the plurality of filament drives;
wherein each of the shafts of the plurality of filament drives is configured to be directly or indirectly driven by a single motor at a rotational rate selected to advance the filament into the 3D printer at a desired feed rate such that each shaft rotates at the same rotational rate, such that each pair of drive wheels and will coordinate to advance the filament while counter-rotating at the same rotational rate without indenting a surface of the filament;
wherein each of the second rotatable shafts of the plurality of drives is configured to independently move towards and away from the first rotatable shafts in a direction substantially normal to the filament path.

2. The filament drive system of claim 1 and further comprising a gear attached to each shaft to form a gear train configured to be driven by the motor to rotate the shafts.

3. The filament drive system of claim 2, wherein each gear is of a monolithic construction and comprises:
a first portion comprising a first set of cogs, wherein adjacent cogs of the first set of cogs are separated by valleys and each cog of the first set of cogs comprises a peak; and
a second portion comprising a second set of cogs, wherein adjacent cogs of the second set of cogs are separated by valleys and each cog of the second set of cogs comprises a peak, wherein the first set of cogs and the second set of cogs are out of phase such that the peak of a cogs of the first set of cogs aligns with valleys in the second portion and wherein the peaks of the cogs of the second set of cogs aligns with valleys in the first portion.

4. The filament drive system of claim 1, wherein the groove on each of the pair of drive wheels is one or more of a V-shaped groove or a U-shaped groove.

5. The filament of drive system of claim 1, wherein the plurality of filament drives comprises three filament drives and two bridge shafts.

6. The filament drive of claim 2, wherein the single motor directly engages the gear directly attached to one of the bridge shafts and indirectly engages each of the first and second shafts of each filament drive of the plurality of filament drives.

7. The filament drive system of claim 1, and further comprising a sealed casing, wherein the casing comprises:
a channel comprising the filament path; and
a plurality of pairs of spaced apart cavities on opposing sides of the filament path, each cavity intersecting the filament path such that portions of the grooves in the paris of drive wheels are configured to enter the filament path and rotatably engage the filament.

8. A 3D printer comprising:
a first filament drive system comprising:
a plurality of filament drives spaced from each other, each drive filament comprising:

a first rotatable shaft;

a second rotatable shaft engaged with the first rotatable shaft in a counter rotational configuration, wherein the second rotatable shaft is configured to linearly move toward and away from the first rotatable shaft in a direction substantially normal to a filament path, wherein the second rotatable shaft is biased towards the first rotatable shaft with a plurality of biasing mechanisms, wherein the plurality of biasing mechanisms comprises a first compression spring and a second compression spring, the first and second springs engaging the second shaft on opposite sides of the groove with the springs normal to the axis of the second shaft to maintain alignment of the first and second rotatable shafts;

a pair of drive wheels each comprising a groove about a circumference with a substantially smooth surface, one fixedly attached on each rotatable shaft, and positioned on opposing sides of the filament path with a gap therebetween so as to frictionally engage a filament provided in the filament path; and one or more bridge shafts, wherein each bridge shaft is configured to rotatably couple the adjacent drives of the plurality of drives;

wherein the shafts of each of the filament drives are configured to be directly or indirectly driven by a single motor at a rotational rate selected to advance the filament into the 3D printer at a desired feed rate such that each shaft rotates at the same rotational rate, such that each pair of drive wheels will coordinate to advance the filament while counter-rotating at the same rotational rate without indenting a surface of the filament;

wherein each of the second rotatable shafts move linearly independent of each other; and a print head spaced from the first filament drive, the print head having a second filament drive configured to accept the filament advanced from the first filament drive and drive the filament into a liquefier wherein the liquefier is configured to create a molten pool of material and extrude material to print a 3D part.

9. The 3D printer of claim 8, and further comprising a gear attached to each shaft to form a gear train configured to be driven by the motor to rotate the shafts.

10. The 3D printer of claim 9, wherein each gear is of a monolithic construction and comprises:

a first portion comprising a first set of cogs, wherein adjacent cogs of the first set of cogs are separated by valleys and each cog of the first set of cogs comprises a peak; and a second portion comprising a second set of cogs, wherein adjacent cogs of the second set of cogs are separated by valleys and each cog of the second set of cogs comprises a peak, wherein the first set of cogs and the second set of cogs are out of phase such that the peak of a cogs of the first set of cogs aligns with valleys in the second portion and wherein the peaks of the cogs of the second set of cogs aligns with valleys in the first portion.

11. The 3D printer of claim 8, wherein the plurality of filament drives comprises three filament drives.

12. The 3D printer of claim 8, and further comprising a sealed casing, wherein the casing comprises:

a channel comprising the filament path; and a plurality of pairs of spaced apart cavities on opposing sides of the filament path, each cavity intersecting the filament path such that portions of the grooves in the pairs of drive wheels are configured to enter the filament path and rotatably engage the filament.

\* \* \* \* \*

UNITED STATES PATENT AND TRADEMARK OFFICE
CERTIFICATE OF CORRECTION

PATENT NO. : 11,267,199 B2
APPLICATION NO. : 15/931415
DATED : March 8, 2022
INVENTOR(S) : Smith et al.

It is certified that error appears in the above-identified patent and that said Letters Patent is hereby corrected as shown below:

On the Title Page

Item (72), add Inventors --Jordan Nadeau, St. Louis Park, MN (US);-- and --Ross Michalkiewicz, Golden Valley, MN (US)--

Signed and Sealed this
Eighth Day of April, 2025

Coke Morgan Stewart
*Acting Director of the United States Patent and Trademark Office*